(12) United States Patent  (10) Patent No.: US 7,914,145 B2
Miura  (45) Date of Patent: Mar. 29, 2011

(54) PROGRESSIVE POWER LENS AND MANUFACTURING METHOD THEREFOR

(75) Inventor: Hitoshi Miura, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 476 days.

(21) Appl. No.: 11/920,383

(22) PCT Filed: Apr. 21, 2006

(86) PCT No.: PCT/JP2006/308399
§ 371 (c)(1),
(2), (4) Date: Nov. 13, 2007

(87) PCT Pub. No.: WO2006/123503
PCT Pub. Date: Nov. 23, 2006

(65) Prior Publication Data
US 2009/0066912 A1    Mar. 12, 2009

(30) Foreign Application Priority Data
May 19, 2005  (JP) .................... 2005-146305

(51) Int. Cl.
*G02C 7/06* (2006.01)
(52) U.S. Cl. ....................... 351/169; 351/159
(58) Field of Classification Search .......... 351/159, 351/168, 169, 177
See application file for complete search history.

(56) References Cited

U.S. PATENT DOCUMENTS
6,074,061 A * 6/2000 Miura ................. 351/169
2004/0257526 A1* 12/2004 Lindacher ............ 351/168

FOREIGN PATENT DOCUMENTS
| JP | 2002-049011 | 2/2002 |
| JP | 2002049011 A * | 2/2002 |
| JP | 2002-323681 | 11/2002 |
| JP | 2003-344813 | 12/2003 |

(Continued)

OTHER PUBLICATIONS

Abstract of Japanese Patent Publication No. 2002-040911, Pub. Date: Feb. 15, 2002, Patent Abstracts of Japan.

(Continued)

*Primary Examiner* — Joseph Martinez
*Assistant Examiner* — James R Greece
(74) *Attorney, Agent, or Firm* — Martine Penilla & Gencarella, LLP

(57) ABSTRACT

A progressive power lens in which distortion aberration is restricted and a manufacturing method therefore are provided. In a progressive power lens in which a progressive refracting surface provided with a first region arranged at an upper part of the lens for viewing relatively far, a second region arranged lower than the first region and having a larger refracting power than that of the first region, and a progressive zone arranged between these regions, whose refracting power is progressively changing, is formed on an inner surface of the lens, when both the far-sighted diopter and the near-sighted diopter are negative, as an upper practical region is separated from a virtual horizontal line passing through the geometric center of the lens, the curvature of the curve of the outer surface of the lens is gradually increased, while as the lower practical region is separated from the horizontal line, the curvature of the curve of the outer surface of the lens is gradually decreased.

17 Claims, 2 Drawing Sheets

FOREIGN PATENT DOCUMENTS

| | | |
|---|---|---|
| JP | 2004-004436 | 1/2004 |
| JP | 2004-264365 | 9/2004 |
| WO | WO 97/19383 | 5/1997 |

OTHER PUBLICATIONS

Abstract of Japanese Patent Publication No. 2002-323681, Pub. Date: Nov. 8, 2002, Patent Abstracts of Japan.

Abstract of Japanese Patent Publication No. 2003-344813, Pub. Date: Dec. 3, 2003, Patent Abstracts of Japan.

Abstract of Japanese Patent Publication No. 2004-004436, Pub. Date: Jan. 8, 2004, Patent Abstracts of Japan.

Abstract of Japanese Patent Publication No. 2004-264365, Pub. Date: Sep. 24, 2004, Patent Abstracts of Japan.

* cited by examiner

PROGRESSIVE POWER LENS AND MANUFACTURING METHOD THEREFOR

TECHNICAL FIELD

The present invention relates to a progressive power lens used for glasses for presbyopia correction and a manufacturing method thereof.

BACKGROUND ART

Presbyopia is a state where an accommodation function by a crystalline lens of an eye is deteriorated and near vision is difficult. A progressive power lens is used for glasses for correcting presbyopia.

In general, the progressive power lens is an aspherical lens provided with two refracting areas with different refracting powers and a progressive area between the both areas where a refracting power (dioptric power) is progressively changed, which enables far vision and near vision with a single lens without a boundary. The two areas refer to a far-sighted part region set at an upper part of a lens and a near-sighted part region set at a lower part of the lens. A progressive region, which is a transfer zone between the far-sighted part region and the near-sighted part region are connected smoothly and continuously.

The far-sighted part region is mainly a region for viewing an object at a far distance, the near-sighted part region is mainly a region for viewing an object at a near distance, and the progressive region is mainly a region for viewing an object at an intermediate distance. However, the refracting power is continuously changing in the progressive power lens, and these areas are not clearly divided.

Since the progressive power lens has asymmetrical distribution of optical performance, its image distortion is more remarkable than that of a spherical lens. Also, the shallower a base curve of a lens becomes, the thinner the progressive power lens can be formed, but distortion aberration and astigmatism tend to become larger. Thus, how to reduce the distortion aberration and astigmatism has been a problem particularly in a thin-type progressive power lens.

Therefore, a progressive power lens for improving the distortion aberration has been proposed. Patent Document 1 is cited as an example of such a progressive power lens.
Patent Document 1: Japanese Patent Laid-Open No. 2004-264365

DISCLOSURE OF THE INVENTION

However, the progressive power lens as in Patent Document 1 is not necessarily sufficient to restrict distortion aberration. Particularly, severe myopia or severe hyperopia persons who wear the progressive power lens with a large addition feel the distortion of a spherical surface as remarkable, and a progressive power lens with better performance have been in demand.

The present invention was made in view of the above problem in the prior arts and has an object to provide a progressive power lens in which distortion aberration is restricted and a manufacturing method therefore.

MEANS FOR SOLVING THE PROBLEM

In order to solve the above problem, an invention in claim 1 is in a progressive power lens in which a progressive refracting surface provided with a first region arranged at an upper part of a lens for viewing relatively far, a second region arranged lower than the first region and having a larger refracting power than that of the first region, and a progressive zone arranged between these regions, whose refracting power is progressively changing, is formed on an inner surface of the lens, an outer surface of the lens is made in a rotationally asymmetrical aspherical shape.

Also, in an invention in claim 2, in addition to the configuration of the invention in claim 1, the rotationally asymmetrical aspherical shape is realized by difference in average surface refracting powers in a practical region in the upper part (hereinafter referred to as an upper practical region) and a practical region in the lower part (hereinafter referred to as a lower practical region) of a geometric center set on the outer surface of the lens.

In an invention in claim 3, in addition to the configuration of the invention in claim 2, the average surface refracting powers of the upper practical region and the lower practical region of the geometric center of the lens are set as the upper practical region>the lower practical region when both the far-sighted diopter and the near-sighted diopter are negative, while they are set as the upper practical region<the lower practical region when both the far-sighted diopter and the near-sighted diopter are positive.

In an invention in claim 4, in addition to the invention in claim 3, when both the far-sighted diopter and the near-sighted diopter are negative, a curve in the perpendicular direction of the outer surface of the lens has any of the following characteristic:

a) As the upper practical region is separated from a virtual horizontal line passing through the geometric center of the lens, the curvature of the curve of the outer surface of the lens is gradually increased, while as the lower practical region is separated from the horizontal line, the curvature of the curve of the outer surface of the lens is gradually decreased;

b) As the upper practical region is separated from a virtual horizontal line passing through the geometric center of the lens, the curvature of the curve of the outer surface of the lens is gradually increased, while the lower practical region has a uniform curvature of the curve; and c) As the lower practical region is separated from a virtual horizontal line, the curvature of the curve of the outer surface of the lens is gradually decreased, while the upper practical region has a uniform curvature of the curve.

In an invention in claim 5, in addition to the configuration of claim 3, when both the far-sighted diopter and the near-sighted diopter are positive, the curve in the perpendicular direction of the outer surface of the lens has any of the following characteristics:

a) As the upper practical region is separated from a virtual horizontal line passing through the geometric center of the lens, the curvature of the curve of the outer surface of the lens is gradually decreased, while as the lower practical region is separated from the horizontal line, the curvature of the curve of the outer surface of the lens is gradually increased;

b) As the upper practical region is separated from a virtual horizontal line passing through the geometric center of the lens, the curvature of the curve of the outer surface of the lens is gradually decreased, while the lower practical region has a uniform curvature of the curve; and c) As the lower practical region is separated from a virtual horizontal line, the curvature of the curve of the outer surface of the lens is gradually increased, while the upper practical region has a uniform curvature of the curve.

In an invention in claim 6, in addition to the configuration of the invention described in claim 4 or 5, an average surface refracting power at a predetermined point (X, Y) located on a virtual horizontal line crossing a virtual perpendicular line passing through the geometric center of the lens on the outer surface of the lens is set considering a weight based on the direction of the predetermined point (X, Y) with a predetermined reference point in the lens as a reference.

In an invention in claim 7, in addition to the configuration of the invention in any one of claims 1 to 6, when a point on the lens outer surface at a distance of 15 mm upward of the lens along a tangent extending in the perpendicular direction at a far-sighted fitting point is set as A and a point on the lens outer surface at a distance of 15 mm downward of the lens as B, the average surface refracting powers P(A) and P(B) of the lens outer surface at the point A and the point B satisfy the following relation:

a) When both the far-sighted diopter and the near-sighted diopter are negative:

$$P(B)+0.25=P(A)=P(B)+ADD$$

b) When both the far-sighted diopter and the near-sighted diopter are positive:

$$P(A)+0.25=P(B)=P(A)+ADD$$

An invention in claim 8 is a manufacturing method of the progressive power lens described in claims 1 to 7, characterized in that data of a predetermined progressive refracting surface is designed which realizes a predetermined progressive characteristic for an inner surface of a lens on the premise that an outer surface of the lens is a spherical shape, then, design is made to synthesize data of a predetermined rotationally asymmetric aspherical shape with the spherical shape data set for the outer surface of the lens in the same spherical shape, a correction amount to correct an astigmatic component and a change in the progressive characteristic generated with deformation design to make the lens outer surface in aspherical shape is added to the data of the progressive refracting surface and then, the both surfaces of the lens are molded based on each data.

In the above configuration, the progressive power lens in which addition gradient is set so that the addition is gradually added from the first region to the second region on the inner surface of the lens has a rotationally asymmetric aspherical shape on the outer surface (surface on the side of the object) of the lens. In this way, by setting a progressive surface on the lens inner surface (surface on the side of an eyeball) and by making the lens outer surface a rotationally asymmetric aspherical shape, distortion aberration can be mainly reduced.

The aspherical shape of the lens outer surface is preferably realized by different average surface refracting powers in the practical region in the upper part (hereinafter referred to as the upper practical region) and the practical region in the lower part (hereinafter referred to as the lower practical region) of the geometric center set on the lens outer surface. In this way, by setting different average surface refracting powers for the upper practical region and the lower practical region holding the geometric center between them of the rotationally asymmetrical aspherical shape, distortion aberration can be mainly reduced.

Here, the practical region refers to the region excluding a lens peripheral edge portion, which is unnecessary in actually placing a lens in a frame (mounting or framing). That is because the peripheral edge portion not functioning as a lens of glasses might be formed in an appropriate curvature configuration without any particular characteristic with a special purpose.

More specifically, when far-sighted diopter and the near-sighted diopter are both negative, the average surface refracting powers of the upper practical region and the lower practical region are preferably set as the upper practical region>the lower practical region, while when they are both positive, the upper practical region<the lower practical region is preferable.

The lens with both the far-sighted diopter and the near-sighted diopter being negative is a so-called concave lens and have a negative distortion characteristic (characteristic that an object appears smaller) for both the upper practical region and the lower practical region. And since the far-sighted diopter is on the negative side than the near-sighted diopter, the far-sighted part has a large negative distortion characteristic, while the near-sighted part has a small negative one. Therefore, by setting the average surface refracting powers of the lens outer surface as the upper practical region>the lower practical region, a refracting power which reduces a difference in distortion between the upper and the lower parts of the lens for a proper balance can be obtained. On the contrary, a lens with both the far-sighted diopter and the near-sighted diopter being positive is a so-called convex lens and have a positive distortion characteristic (characteristic that an object appears larger) for both the upper practical region and the lower practical region. And since the near-sighted diopter is on the positive side than the far-sighted diopter, the far-sighted part has a small positive distortion characteristic, while the near-sighted part has a large positive one. Therefore, by setting the average surface refracting powers of the lens outer surface as the upper practical region<the lower practical region, a refracting power which reduces a difference in distortion between the upper and the lower parts of the lens for a proper balance can be obtained.

That is, a lens with both the far-sighted diopter and the near-sighted being negative or a lens with both the far-sighted diopter and the near-sighted being positive is suitable for application of the present invention.

In the concave lens, the average surface refracting power is preferably set as the upper practical region>the lower practical region in terms of characteristics but more specifically, when both the far-sighted diopter and the near-sighted diopter are negative, the curve in the perpendicular direction on the lens outer surface has preferably any of the following characteristics:

a) As the upper practical region is separated from a virtual horizontal line passing through the geometric center of the lens, the curvature of the curve of the outer surface of the lens is gradually increased, while as the lower practical region is separated from the horizontal line, the curvature of the curve of the outer surface of the lens is gradually decreased;

b) As the upper practical region is separated from a virtual horizontal line passing through the geometric center of the lens, the curvature of the curve of the outer surface of the lens is gradually increased, while the lower practical region has a uniform curvature of the curve; and c) As the lower practical region is separated from a virtual horizontal line, the curvature of the curve of the outer surface of the lens is gradually decreased, while the upper practical region has a uniform curvature of the curve.

Here, the geometric center refers to the geometric center of a lens before being machined in conformity with the shape of a frame (circular-shaped lens). When the curvature of the curve of the lens outer surface is gradually increased or gradually decreased as being separated from the virtual horizontal line passing through the geometric center of the lens, as setting means for a realistic aspherical sag amount, an odd function (such as cubic function) is the simplest and easy for calculation. However, if the change of curvature from the upper part to the lower part of the lens is continuous, it is possible to combine even functions or asymmetrical functions.

Suppose that the lens outer surface is a spherical shape as the base and a curve in the perpendicular direction of the outer surface of the above lens is to be synthesized, for example. Then, since an aspherical amount is given to the perpendicular component, distortion aberration is gradually decreased, but a sectional shape in the horizontal direction at this time is still the same as the sectional shape in the horizontal direction of the base spherical surface.

Therefore, when average surface refracting power at a predetermined point (X, Y) located on the virtual horizontal line crossing the virtual perpendicular line passing through the geometric center of the lens is to be set for the above negative lens on the lens outer surface, a weight based on the direction of the predetermined point (X, Y) with a predetermined reference point in the lens as a reference is preferably considered from the viewpoint of further reduction of the distortion aberration.

Here, the most typical "predetermined reference point in a lens" can be a far-sighted fitting point, a geometric center or the like. The weight is determined based on the direction of the predetermined point (X, Y) from the reference point, and it is possible to use for the direction in actual calculation an argument θ with the virtual horizontal line passing through the geometric center, for example, as a reference. That is, the weight can be allocated at the predetermined point (X, Y), using a trigonometric function (particularly, sine function) or a polar coordinate so as to set the average surface refracting power in the optimal condition. Also, it is possible to consider the weight based on a distance from the reference point to the predetermined point (X, Y) in addition to the direction. In that case, calculation based on a vector of the predetermined point (X, Y) from the reference point is possible.

The average surface refracting power is preferably as the upper practical region<the lower practical region in a convex lens as above in terms of characteristics, but more specifically, when both the far-sighted diopter and the near-sighted diopter are positive, the curve in the perpendicular direction of the lens outer surface more preferably has any of the following characteristics:

a) As the upper practical region is separated from a virtual horizontal line passing through the geometric center of the lens, the curvature of the curve of the outer surface of the lens is gradually decreased, while as the lower practical region is separated from the horizontal line, the curvature of the curve of the outer surface of the lens is gradually increased;

b) As the upper practical region is separated from a virtual horizontal line passing through the geometric center of the lens, the curvature of the curve of the outer surface of the lens is gradually decreased, while the lower practical region has a uniform curvature of the curve; and c) As the lower practical region is separated from a virtual horizontal line, the curvature of the curve of the outer surface of the lens is gradually increased, while the upper practical region has a uniform curvature of the curve.

The definition of the geometric center is the same as above. When the curvature of the curve of the lens outer surface is gradually increased or gradually decreased as being separated from the virtual horizontal line passing through the geometric center of the lens, as setting means for a realistic aspherical sag amount, an odd function (such as cubic function) is the simplest and easy for calculation as above. However, if the change of curvature from the upper part to the lower part of the lens is continuous, it is possible to combine even functions or any other asymmetrical functions.

For the plus lens, similarly to the above, the average surface refracting power at the predetermined point (X, Y) located on the virtual horizontal line crossing the virtual perpendicular line passing through the lens geometric center on the lens outer surface is preferably set based on the direction of the predetermined point (X, Y) with the predetermined reference point in the lens as a reference from the viewpoint of further reduction of distortion aberration. Also, it is possible to consider weight based on the distance from the reference point to the predetermined point (X, Y) in addition to the direction.

Moreover, when a point on the lens outer surface at a distance of 15 mm upward of the lens along the tangent extending in the perpendicular direction at the far-sighted fitting point is made as A and a point on the lens outer surface at a distance of 15 mm downward of the lens as B, the average surface refracting powers P(A) and P(B) on the lens surface at the points A and B preferably satisfy the following relations:

a) When both the far-sighted diopter and the near-sighted diopter are negative:

$$P(B)+0.25=P(A)=P(B)+ADD$$

b) When both the far-sighted diopter and the near-sighted diopter are negative:

$$P(A)+0.25=P(B)=P(A)+ADD$$

That is, a difference between the average surface refracting powers of the two points with a vertical distance of 30 mm on the lens outer surface with the far-sighted fitting point between them is made as 0.25 (D: diopter) to ADD (addition). This is one of indexes showing a limitation of the difference in the average surface refracting power between the upper practical region and the lower practical region. Since the interval between the upper and the lower practical regions of a generally-used lens for glasses is approximately 30 mm, it is significant to specify the optimal difference in the average surface refracting powers between the upper and the lower practical regions at this interval of 30 mm. The difference in the average surface refracting power is made larger than 0.25 D because there would be no optical significance any more in reducing the distortion aberration with the power smaller than this. Also, the difference in the average surface refracting power is confined to ADD mainly because of an appearance of the lens (the difference in curvature of the curves of the upper and the lower practical areas is large and gives a sense of discomfort).

When a progressive power lens in which the lens inner surface is a progressive refracting surface and the lens outer surface is rotationally asymmetrical aspherical shape is to be produced as above, it is preferable to assume the spherical surface for the lens outer surface, first, and to design the progressive refracting-power surface for the lens inner surface based on that for simplification of calculation. However, combination of the spherical shape of the lens outer surface with the rotationally asymmetrical aspherical shape might generate an astigmatic component.

In order to correct that, it is preferable that on the premise that the lens outer surface is a spherical shape, data of a predetermined progressive refracting surface is designed so that a predetermined progressive characteristic is realized for the lens inner surface and then, design to synthesize data of a predetermined rotationally asymmetrical aspherical shape is made for the lens outer surface in the same spherical shape, an astigmatic component generated with deformation design to make the lens outer surface in the aspherical shape and a correction value to correct the change in the progressive characteristic are added to the data of the progressive refracting surface and then, the both surfaces of the lens are molded based on the data.

Here, the "rotationally asymmetrical aspherical shape" is the case where the average surface refracting powers of the practical region of the upper part (hereinafter referred to as the upper practical region) and the practical region of the lower part (hereinafter referred to as the lower practical region) of the geometric center set on the lens outer surface as above are different, and the average surface refracting powers of the upper practical region and the lower practical region of the lens geometric center are preferably set as upper practical region>lower practical region when both the far-sighted diopter and the near-sighted diopter are negative, while when both of them are positive, the average surface refracting powers are preferably set as upper practical region<lower practical region. The case where the far-sighted diopter and the near-sighted diopter are both negative or the far-sighted diopter and the near-sighted diopter are both positive is also included. The aspherical characteristic of the upper practical region and the lower practical region is also as mentioned above.

Moreover, the molding of the both surfaces of the lens includes not only direct cutting or grinding of a base material but also molding by a plastic molding method by a mold.

In the invention of each of the above claims, a progressive power lens in which particularly distortion aberration is restricted as compared with conventional ones can be provided.

BEST MODE FOR CARRYING OUT THE INVENTION

Embodiments of a progressive power lens of the present invention will be described below.

A. Minus Lens

Embodiment 1

(1) Setting of the Lens

Progressive zone length: 13 mm
Refractive index of lens material: 1.6
Far-sighted S-5.00 D
Addition: 2.00 D
Radius of curvature of front curve (base curve): 261.50 mm
Far-sighted fitting point: 2 mm above the geometric center of the lens
An approximate curve increase of 1.00 D in the perpendicular direction at 15 mm above the geometric center O in the perpendicular direction and an approximate curve decrease of 1.00 D in the perpendicular direction at 15 mm below in the perpendicular direction are added, respectively. Deformation is made at 15 mm above and below the geometric center O here since a general frame shape is considered. This setting is only one of examples and can be changed.

(2) Setting of a Sag Amount on the Lens Outer Surface

As the simplest example in Embodiment 1, a surface refracting power in the perpendicular direction of the lens outer surface is changed. An aspherical amount on the horizontal line (x direction) passing through the geometric center O is set as 0. That is, a horizontal section passing through the point O is circular. The aspherical amount from the geometric center O upward is changed to positive, while the aspherical amount from the point O downward is changed to negative. Suppose that a direction crossing the horizontal line (x direction) is y direction. Here, the positive aspherical amount means a direction from the outer surface to the inner surface of a lens, while the negative amount is the contrary (the same applies to the following examples and comparative examples).

In this Embodiment 1, the aspherical amount is set as follows:

$$f(y)=ay^3 \qquad \text{equation 1}$$

(y: Distance [mm] in the perpendicular direction from O, a is a positive coefficient)

That is, the aspherical amount of the outer surface is determined by cubic function. Therefore, the lens outer surface of Embodiment 1 is a synthetic surface of the base curve and this equation 1.

Here, the coefficient a for obtaining an approximate curve change of the above 1.00 D is acquired.

By substituting y=15 for an equation obtained by second-order derivative of the above equation 1 for y, it gives (6×15)a. Since this value is approximately equal to the curvature change of the lens outer surface, it gives the following:

$$(6 \times 15)a = 1/(1000 \cdot (n-1))$$

Here, n is a refractive index of the lens material, and since the refractive index of the lens is 1.6 in this Embodiment, n=1.6 is substituted and $a=1.852 \times 10^{-5}$ is obtained.

(3) Shape of the Lens Inner Surface

In addition to a predetermined progressive surface, the same deformation amount of the outer surface is added to the inner surface. As a result, distribution of astigmatism to be a diopter and an astigmatic component becomes close to the original state (outer surface is a spherical surface). We call this operation as bending. The bending generally refers to change of the curvatures of the spherical outer surface and the spherical inner surface, respectively, while the power of the lens is maintained. Here, this idea is extended and the operation to make the back surface aspherical by an equal amount when the front surface is made aspherical is also called as bending.

Starting from this state, the coefficient a of the inner surface is given fine adjustment, and an average diopter (evaluated by a lens meter) at a far-sighted diopter measurement position is returned to −5.00 D.

Next, adjustment is made by multiplying the sag distribution of the progressive surface shape by an appropriate coefficient to return the average diopter at the near-sighted diopter measurement position to −3.00 D. This operation is also possible by performing deformation according to the shape of the outer surface by independent coefficients for the upper part and the lower part of the lens.

Also, in order to reduce the astigmatism of transmitted light, an aspherical surface is further synthesized to the lens inner surface (transmitted light correction).

In this Embodiment, the aspherical surface in the following format is synthesized:

$$g(r)=br^3$$

A deformation amount required for the transmitted light correction, that is, the value of a coefficient b is different between the far-sighted and the near-sighted, and it is displaced according to the direction. That is, the value b is made as a far-sighted value upward in the perpendicular direction, while the value b is made as a near-sighted value downward in the perpendicular direction, the value is made as an intermediate value of the far-sighted and the near-sighted in the horizontal direction, and it is displaced according to the ratio of an angle along the circumference.

The center of the aspherical surface to be added is set at 5 mm below the geometric center O as shown in FIG. 4. This position is substantially the center of the diopter change from the far-sighted to the near-sighted and suitable as a center for changing optical performance of the far-sighted and the near-sighted, respectively. At a point immediately above or immediately below the center of deformation, for example, the perpendicular direction becomes a direction away from the center, that is, the meridional direction, while the horizontal direction becomes a direction crossing the meridional direction, that is, the sagittal direction. The curve change when an aspherical surface is added is larger in the meridional direction than in the sagittal direction. The astigmatism can be reduced utilizing this nature.

The average diopter evaluated by transmitted light becomes stronger (both in the negative diopter and the positive diopter) than the average diopter evaluated by lens meter light. In order to cope with this problem, the average diopter evaluated by transmitted light can be shifted to a weaker one (that is, to the diopter originally required) by the aspherical surface added to the inner surface. At this time, distortion of an image is decreased at the same time.

(4) Features of a Lens of the Example 1

This lens is a powerful minus lens of far-sighted S-5.00 D. If the base curve on the lens outer surface is made shallow in this type of lens, the aberration tends to be larger. However, in Embodiment 1, since the aspherical amount of the outer surface is given by cubic function in the perpendicular direction, the aberration can be reduced despite the shallow base curve.

The outer surface of such a lens has a longitudinal sectional shape getting the deeper gradually (curvature of the curve being gradually increased) as going upward as shown by a broken line with respect to the base curve B above the horizontal line in FIG. 1, while it is getting shallower (curvature of the curve being gradually decreased) as going downward below the horizontal line.

(5) Evaluation Contents of Optical Performance of Embodiment 1

Evaluation is made for the average diopter, astigmatism and distortion aberration using simulation by transmitted light. For the distortion aberration, a method is employed that a circle in the 45-degree direction from the visual line seeing the front is drawn and a visual field within it is evaluated. A lattice with an equal interval in vertical and horizontal directions is arranged at a position 10 m before eyes and how it is seen is simulated. The interval of the lattice is set at 2 m. Since there is disturbance in a light beam in a portion where the progressive surface outside the practical region is not fully adjusted outside the circle, this is only reference data. Coordinates in the horizontal/perpendicular direction in each figure correspond to positions where the light beam passes through the lens outer surface.

An equal diopter curve and an equal astigmatism curve are shown with an interval of 0.25 D and a thick line at 1.00 D step.

The evaluation result is shown in Tables 1 to 3.

Embodiment 2

(1) Setting of the Lens

Same as that of Embodiment 1.

However, the setting of the curve of the aspherical surface on the lens outer surface is different from that of Embodiment 1, and an approximate curve increase of 1.00 D is added in the horizontal direction at 15 mm above the geometric center in the perpendicular direction and an approximate curve decrease of 1.00 D in the horizontal direction at 15 mm below in the perpendicular direction are added, respectively.

(2) Setting of a Sag Amount of the Lens Outer Surface

In Embodiment 1, the curve in the perpendicular direction is gradually decreased, but in Embodiment 2, increase/decrease of the curve in the perpendicular direction is restricted. An aspherical surface amount on the horizontal line (x direction) passing through the geometric center O is set as O. That is, the horizontal section passing through the point O is circular. The aspherical amount is changed to positive upward from the geometric center O, while the aspherical amount is changed to negative downward from the point O. A direction crossing the horizontal line (x direction) is y direction.

In this Embodiment 2, the aspherical amount is set as follows:

$$f(x,y)=ax^2y \qquad \text{equation 2}$$

(x: Distance [mm] in the horizontal direction from O, y: Distance [mm] in the perpendicular direction from O, a is a positive coefficient)

When y=15 is substituted for an equation obtained by second-order partial derivative of the equation 2 for x in order to acquire the coefficient a similarly to Embodiment 1, it gives (2×15)a. Since this value is approximately equal to the change in curvature of the lens outer surface, it gives the following:

$$(2\times15)a=1/(1000\cdot(n-1))$$

Then n=1.6 is substituted for this formula and $a=5.556\times10^{-5}$ is obtained.

(3) Shape of the Lens Inner Surface

The same deformation amount the outer surface is added to the inner surface in this lens as in Embodiment 1.

(4) Features of a Lens of Embodiment 2

This lens is also a powerful minus lens as in Embodiment 1. However, in Embodiment 2, the surface P on which the aspherical amount is simulated has a deeper horizontal curve on the outer surface in the upper part of the lens as shown in FIG. 2. The change in the curve from the upper part to the lower part of the lens is in proportion with y and the change is substantially constant.

(5) Evaluation Contents of Optical Performance of Embodiment 2

Evaluation is made for the average diopter, astigmatism and distortion aberration similarly to Embodiment 1. The evaluation method is the same. The evaluation results are shown in Tables 1 to 3.

Embodiment 3

(1) Setting of the Lens

Same as that of Embodiment 1.

However, the setting of the curve of the aspherical surface on the lens outer surface is different from that of Embodiment 1, and an approximate curve increase of 0.50 D is added in the perpendicular and the horizontal directions at 15 mm above the geometric center in the perpendicular direction and an approximate curve decrease of 0.50 D in the perpendicular and the horizontal directions at 15 mm below in the perpendicular direction are added, respectively.

(2) Setting of a Sag Amount of the Lens Outer Surface

In Embodiment 3, the distortion aberration is restricted in all the directions to which an aspherical amount is given considering the weight in the position and direction of the point (X, Y) on the lens outer surface.

An aspherical surface amount on the horizontal line (x direction) passing through the geometric center O is set as O. That is, the horizontal section passing through the point O is circular. The aspherical amount is changed to positive upward from the geometric center O, while the aspherical amount is changed to negative downward from the point O. A direction crossing the horizontal line (x direction) is y direction.

In Embodiment 3, the aspherical amount is set as follows:

$$f(x,y)=ax^3 \cdot \sin\theta \qquad \text{equation 3}$$

(x: Distance [mm] in the horizontal direction from O, y: Distance [mm] in the perpendicular direction from O, a is a positive coefficient, θ: Deflection angle with respect to the horizontal line with the geometric center O as the center, r: Distance from the geometric center O)

Since sin θ is a sine function taking a value of 0 to 1 as shown in FIG. 3, this is an advantageous function to give a weight according to the direction of the point (X, Y).

$$r=(x^2+y^2)^{1/2}, \sin\theta=y/r$$

Thus, this equation can be represented not using the deflection angle θ by deformation to:

$$f(x,y)=a(x^2+y^2)y$$

Similarly to Embodiment 1, the coefficient a is acquired. First, when y=15 is substituted for an equation obtained by second-order partial derivative of the equation 3 for x, it gives (2×15)a. Then, when y=15 is substituted for the equation obtained by second-order partial derivative for y, it gives (6×15)a. Their average is (4×15)a. Since this value is equal to the average change in curvature of the lens outer surface, by substituting n=1.6 in the following:

$$(4 \times 15)a = 0.5/(1000 \cdot (n-1))$$

$a=1.389 \times 10^{-5}$ is obtained.

(3) Shape of the Lens Inner Surface

The same deformation amount the outer surface is added to the inner surface in this lens as in Embodiment 1.

(4) Features of a Lens of Embodiment 2

This lens is also a powerful minus lens as in Embodiment 1. However, in Embodiment 3, since the aspherical amount on the lens outer surface is weighted by the position and direction of the point (X, Y) on the lens outer surface (since sing is multiplied), the aspherical amount becomes 0 on the horizontal section (y=0) passing through the geometric center O. That is, as in Embodiment 1, the horizontal section passing through the geometric center O is circular. On the other hand, in the vicinity of the area on the horizontal line (x=0) passing through the geometric center O, the shape resembles a rotationally asymmetrical aspherical one. Therefore, a phenomenon of deformation of an object vertically or horizontally in the most important front visual field in a progressive power lens can be restricted.

(5) Evaluation Contents of Optical Performance of Embodiment 3

Evaluation is made for the average diopter, astigmatism and distortion aberration similarly to Embodiment 1. The evaluation method is the same. The evaluation results are shown in Tables 1 to 3.

Comparative Example 1

For comparison with the above Embodiments 1 to 3, the average diopter, astigmatism and distortion aberration are also evaluated for a lens with the same lens setting and a spherical lens outer surface. The evaluation method is the same. The evaluation results are shown in Tables 1 to 3.

[Table 1]

No transmitted light correction, With transmitted light correction

Comparative Example 1
Embodiment 1
Embodiment 2
Embodiment 3

[Table 2]

No transmitted light correction, With transmitted light correction

Comparative Example 1
Embodiment 1
Embodiment 2
Embodiment 3

[Table 3]

No transmitted light correction, With transmitted light correction

Comparative Example 1
Embodiment 1
Embodiment 2
Embodiment 3

B. Plus Lens

Embodiment 4

(1) Setting of the Lens

Progressive zone length: 13 mm
Refractive index of lens material: 1.6
Far-sighted S+3.00 D
Addition: 2.00 D
Radius of curvature of front curve (base curve): 108.96 mm
Far-sighted fitting point: 2 mm above the geometric center of the lens
An approximate curve decrease of 1.00 D in the perpendicular direction at 15 mm above the geometric center O in the perpendicular direction and an approximate curve increase of 1.00 D in the perpendicular direction at 15 mm below in the perpendicular direction are added, respectively. Deformation is made at 15 mm above and below of the geometric center O here since a general frame shape is considered. This setting is only one of examples and can be changed.

(2) Setting of a Sag Amount on the Lens Outer Surface

The coefficient a in Embodiment 1 is set in negative ($a=-1.852 \times 10^{-5}$)

(3) Shape of the Lens Inner Surface

In addition to a predetermined progressive surface, the same deformation amount of the outer surface is added to the inner surface as in the minus lens.

Also, in order to reduce the astigmatism of transmitted light, an aspherical surface is further synthesized to the lens inner surface.

(4) Features of a Lens of Embodiment 4

This lens is a powerful plus lens of far-sighted S+3.00 D and addition of 2.00 D. If the base curve on the lens outer surface is made shallow in this type of lens, the aberration tends to be larger. However, in Embodiment 4, since the aspherical amount of the outer surface is given by cubic function in the perpendicular direction, the aberration can be reduced despite the shallow base curve.

(5) Evaluation Contents of Optical Performance of Embodiment 4

Evaluation is made for the average diopter, astigmatism and distortion aberration similarly to Embodiment 1. The evaluation method is the same. However, the interval of the lattice is set at 1 m.

The evaluation results are shown in Tables 4 to 6.

Embodiment 5

(1) Setting of the Lens

Same as that of Embodiment 4.

However, the setting of the curve of the aspherical surface on the lens outer surface is different from that of Embodiment 4, and an approximate curve decrease of 1.00 D is added in the horizontal direction at 15 mm above the geometric center in the perpendicular direction and an approximate curve increase of 1.00 D in the horizontal direction at 15 mm below in the perpendicular direction are added, respectively.

(2) Setting of a Sag Amount of the Lens Outer Surface

The coefficient a in Embodiment 2 is set in negative ($a=-5.556 \times 10^{-5}$)

(3) Shape of the Lens Inner Surface

In addition to a predetermined progressive surface, the same deformation amount of the outer surface is added to the inner surface as in the minus lens.

Also, in order to reduce the astigmatism of transmitted light, an aspherical surface is further synthesized to the lens inner surface.

(4) Features of a Lens of Embodiment 4

This lens is also a powerful plus lens as in Embodiment 4. However, in Embodiment 5, the horizontal curve on the outer surface becomes shallower in the upper part of the lens to the contrary of FIG. 2. On the other hand, the horizontal curve becomes deeper in the lower part of the lens. The change in the curve from the upper part to the lower part of the lens is in proportion with y and the change is substantially constant.

(5) Evaluation Contents of Optical Performance of Embodiment 5

Evaluation is made for the average diopter, astigmatism and distortion aberration similarly to Embodiment 4. The evaluation method is the same.

The evaluation results are shown in Tables 4 to 6.

Embodiment 6

(1) Setting of the Lens

Same as that of Embodiment 4.

However, the setting of the curve of the aspherical surface on the lens outer surface is different from that of Embodiment 4, and an approximate curve decrease of 0.50 D is added in the perpendicular and the horizontal direction at 15 mm above the geometric center in the perpendicular direction and an approximate curve increase of 0.50 D in the perpendicular and the horizontal direction at 15 mm below in the perpendicular direction are added, respectively.

(2) Setting of a Sag Amount of the Lens Outer Surface

The coefficient a in Embodiment 3 is set in negative ($a=-1.389 \times 10^{-5}$)

(3) Shape of the Lens Inner Surface

In addition to a predetermined progressive surface, the same deformation amount of the outer surface is added to the inner surface as in the minus lens.

Also, in order to reduce the astigmatism of transmitted light, an aspherical surface is further synthesized to the lens inner surface.

(4) Features of a Lens of Embodiment 6

This lens is also a powerful plus lens as in Embodiment 1. However, in Embodiment 6, since the aspherical amount on the lens outer surface is weighted by the position and direction of the point (X, Y) on the lens outer surface (since sin θ is multiplied), the aspherical amount becomes 0 on the horizontal section (y=0) passing through the geometric center O. That is, as in Embodiment 1, the horizontal section passing through the geometric center O is circular. On the other hand, in the vicinity of the area on the horizontal line (x=0) passing through the geometric center O, the shape resembles a rotationally asymmetrical aspherical one. Therefore, a phenomenon of deformation of an object vertically or horizontally in the most important front visual field in a progressive power lens can be restricted.

(5) Evaluation Contents of Optical Performance of Embodiment 6

Evaluation is made for the average diopter, astigmatism and distortion aberration similarly to Embodiment 4.

The evaluation results are shown in Tables 4 to 6.

Comparative Example 2

For comparison with the above Embodiments 4 to 6, the average diopter, astigmatism and distortion aberration are also evaluated for a lens with the same lens setting and a spherical lens outer surface. The evaluation method is the same. The evaluation results are shown in Tables 4 to 6.

[Table 4]
No transmitted light correction, With transmitted light correction
Comparative Example 1
Embodiment 4
Embodiment 5
Embodiment 6

[Table 5]
No transmitted light correction, With transmitted light correction
Comparative Example 1
Embodiment 4
Embodiment 5
Embodiment 6

[Table 6]
No transmitted light correction, With transmitted light correction
Comparative example 1
Embodiment 4
Embodiment 5
Embodiment 6

C. Evaluation Result (1) Comparison of Average Diopter (Table 1)

The diopter distribution has seen obvious improvement in the upper region in all the Embodiments as compared with the comparative example 1. It is known that further improvement was made by transmitted light correction.

(2) Comparison of Astigmatism (Table 2)

Obvious improvement was found in all the Embodiments. It is known that further improvement was made by transmitted light correction.

(3) Comparison of Distortion Aberration (Table 3)

Embodiment 1 (aspherical surface in vertical direction): Distortion at the upper end of the lens becomes smaller.

Embodiment 2: The vertical line on the side becomes relatively straight.

Embodiment 3: The result is in the middle of t Embodiment 1 and Embodiment 2. That is, distortion is improved evenly in the vertical and the horizontal directions.

Also, in all the Embodiments, distortion is improved by transmitted light correction.

(4) Comparison of Average Diopter (Table 4)

Obvious improvement is found in all the Embodiments. As a remarkable phenomenon, an equal diopter curve has an angle close to a vertical direction on the side of the far-sighted part. This is also cause of distortion for a wearer when the wearer moves the face right or left. In the Embodiments with transmitted light correction, this tendency is restricted.

(5) Comparison of Astigmatism (Table 5)

Obvious improvement is found in all the Embodiments but astigmatism distribution is particularly smooth in Embodiment 6 with transmitted light correction.

(6) Comparison of Distortion Aberration (Table 6)

It has a similar tendency to Embodiments of the minus lens.

Figure 1:
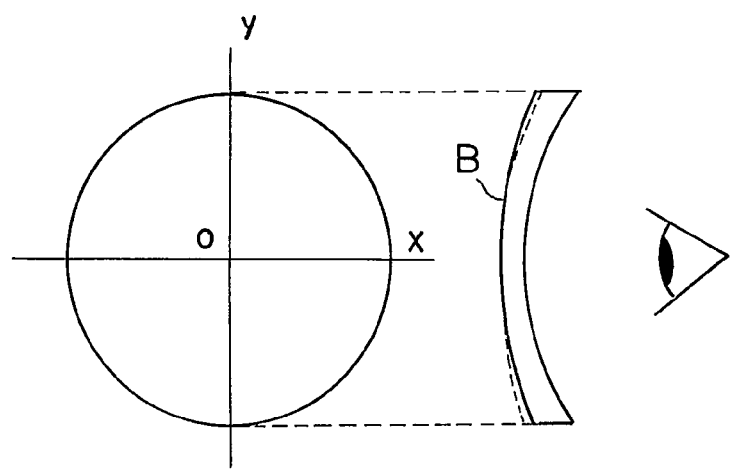
FIG. 1 is an explanatory view explaining the shape of Embodiment 1 of the present invention.
Figure 2:
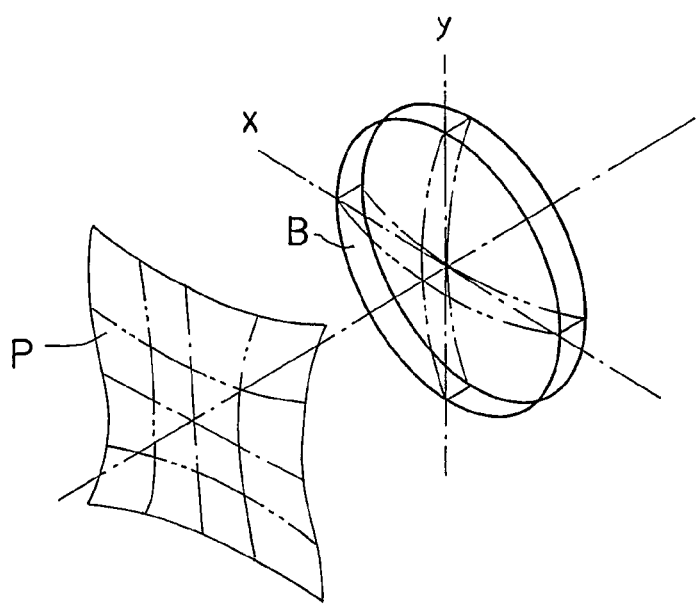
FIG. 2 is an explanatory view explaining the shape of Embodiment 2 of the present invention.
Figure 3:
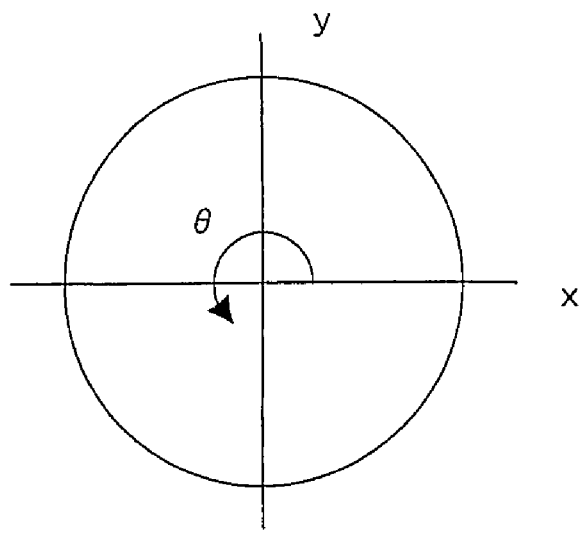
FIG. 3 is an explanatory view explaining an equation to give an aspherical amount in lens design of Embodiment 3 of the present invention.
Figure 4:
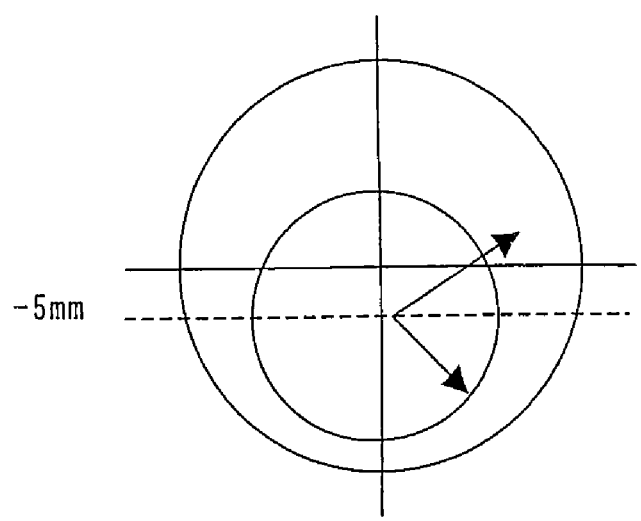
FIG. 4 is an explanatory view explaining the shape of a lens inner surface of Embodiment of the present invention.

[Table 1]
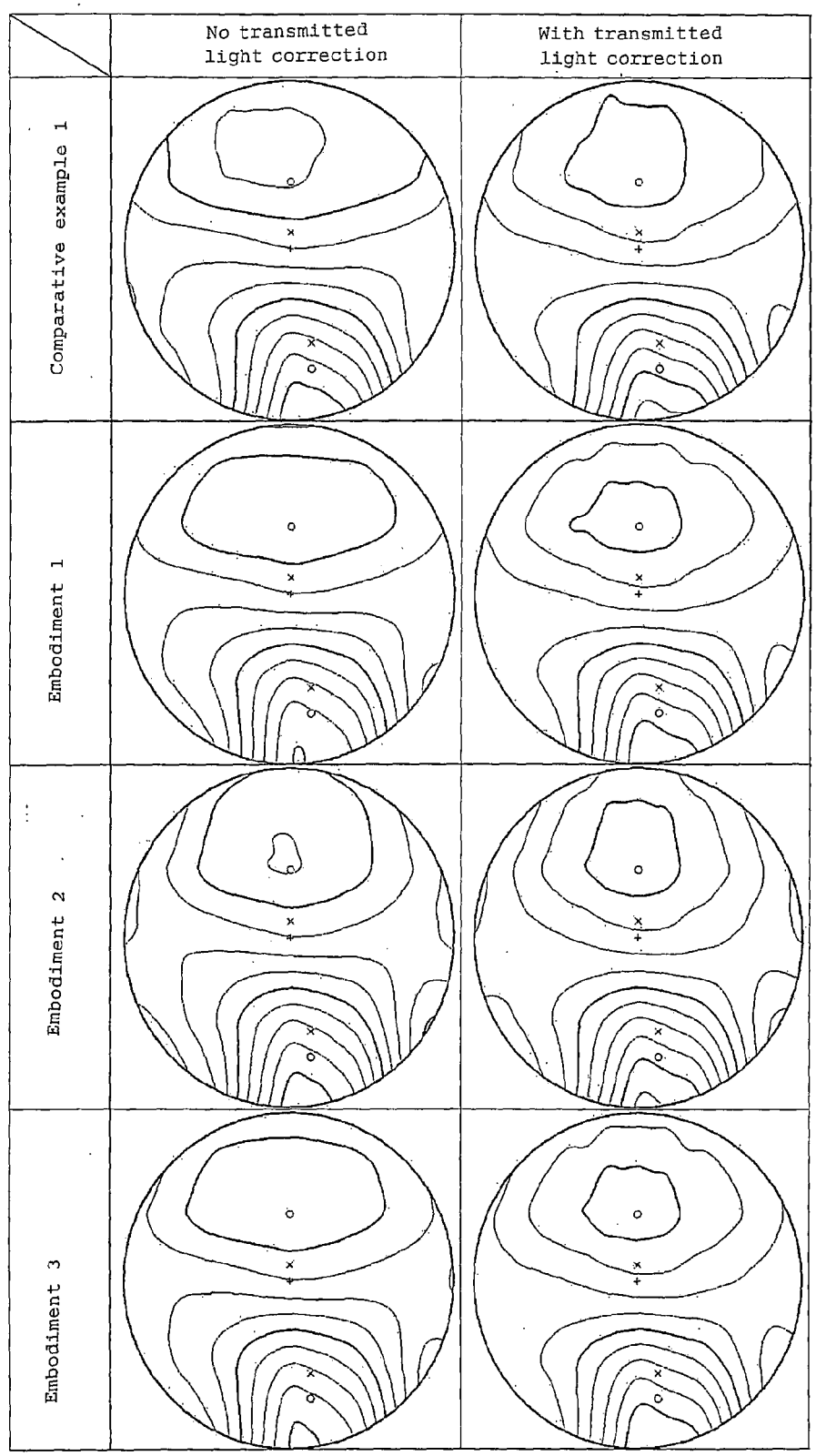

[Table 2]
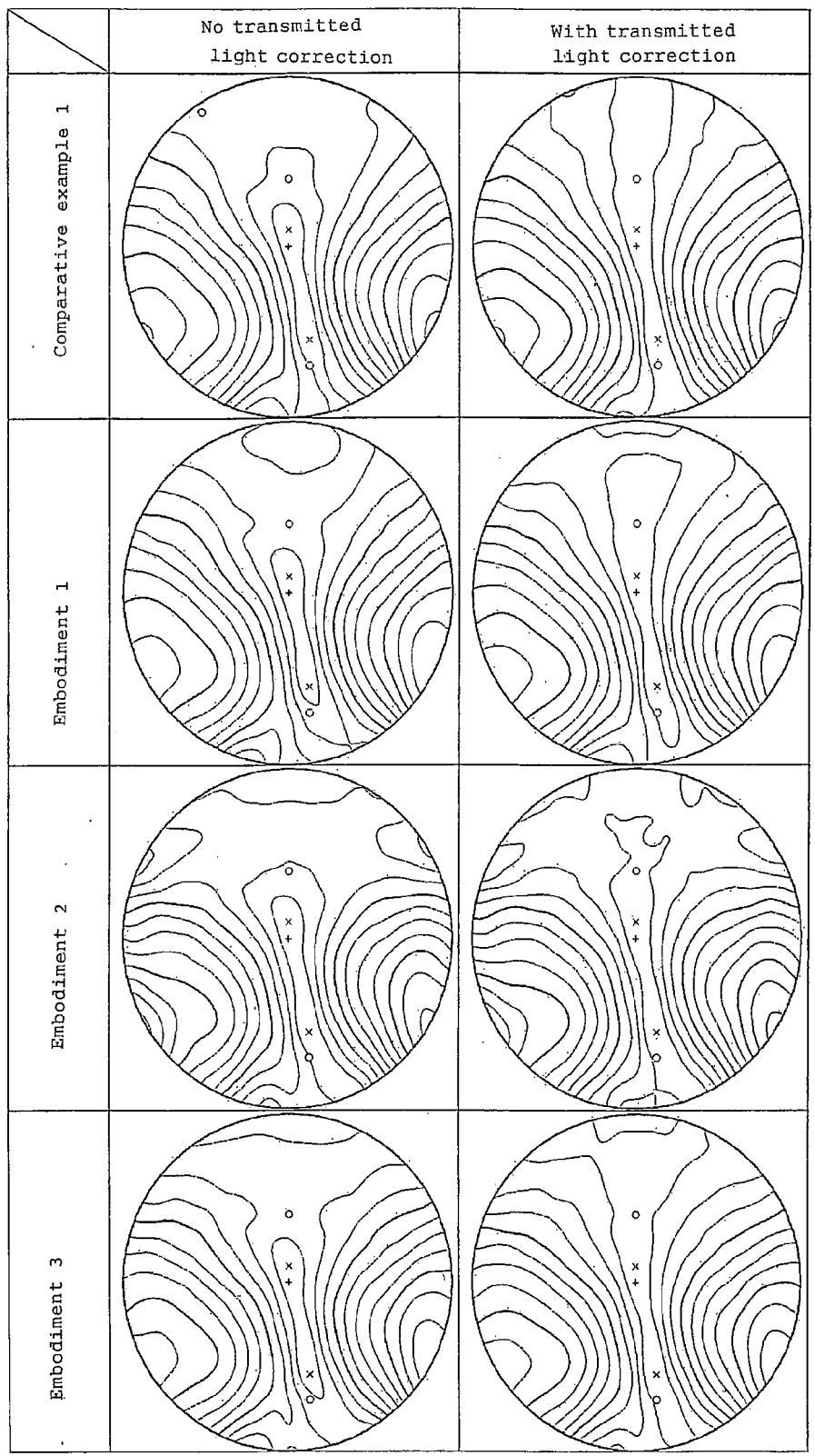

[Table 3]
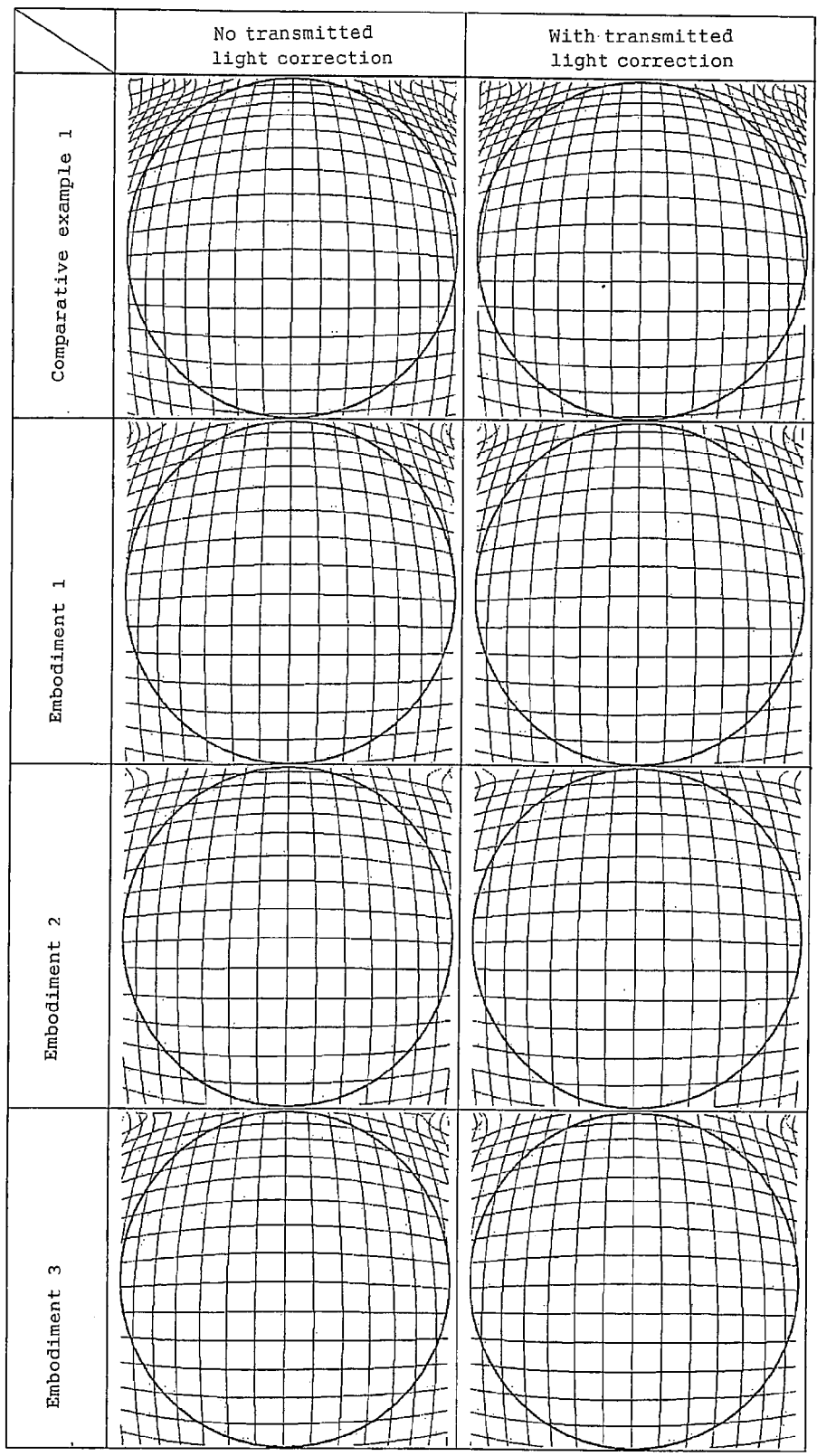

[Table 4]
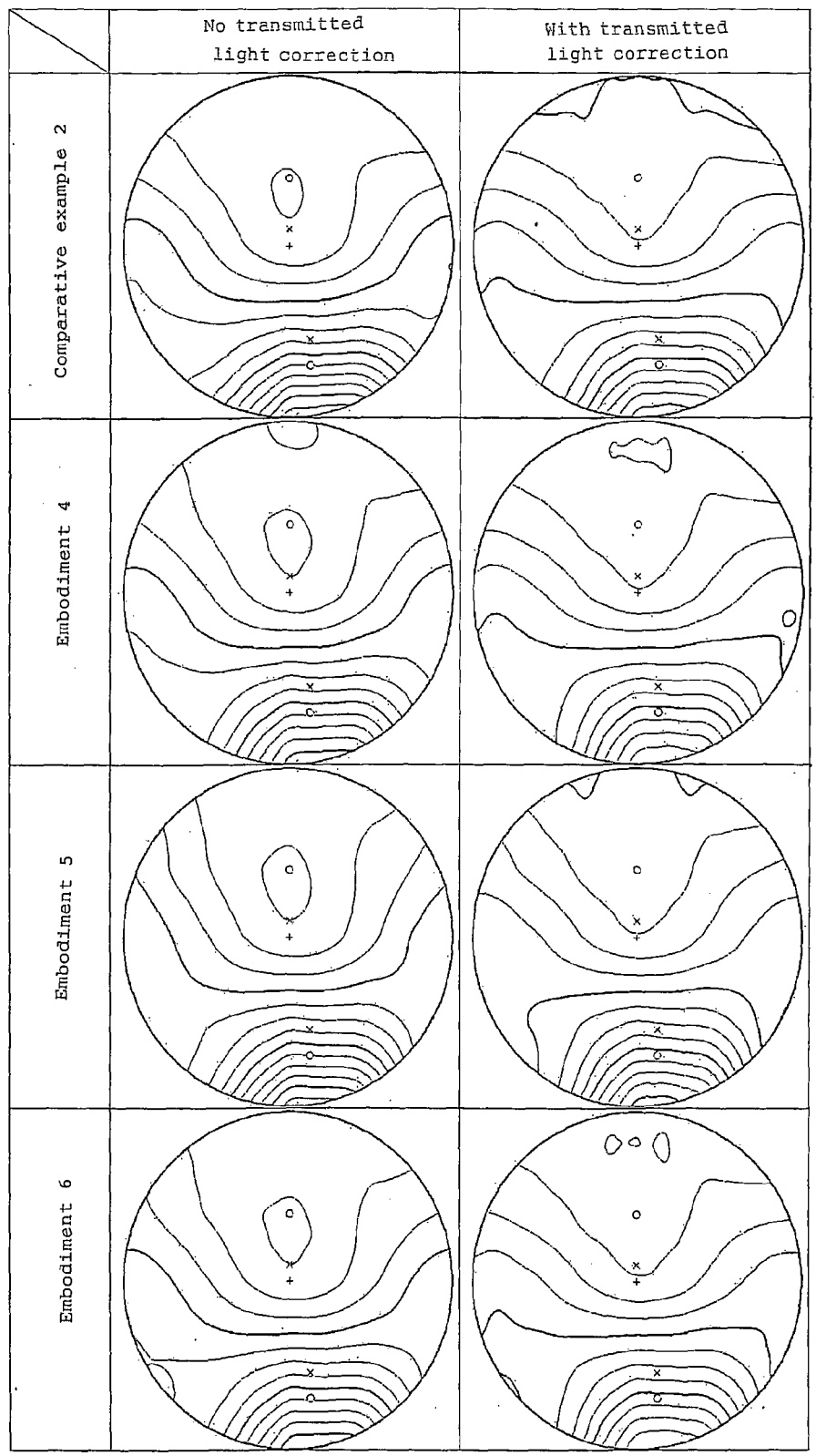

[Table 5]
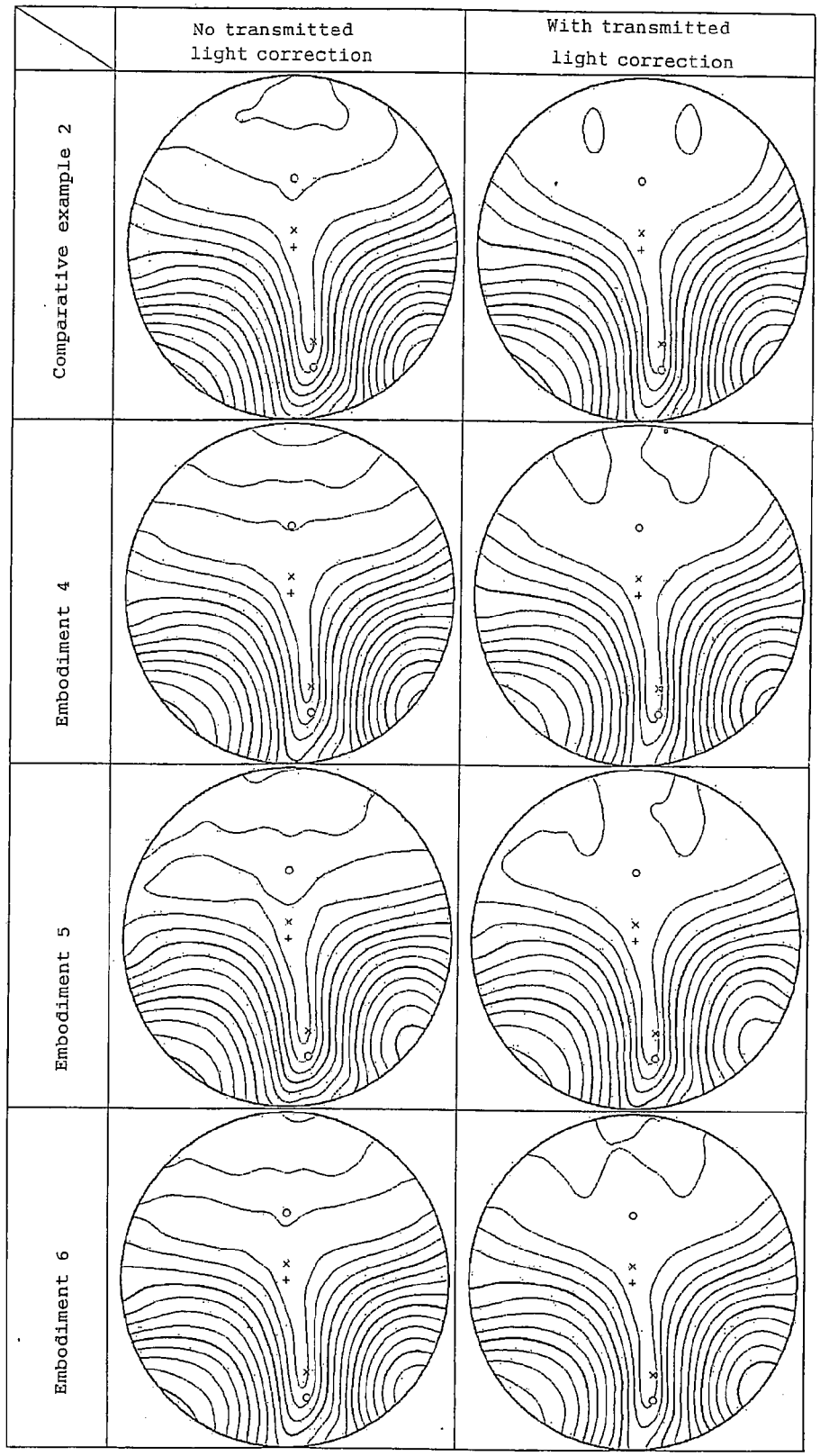

[Table 6]

| | No transmitted light correction | With transmitted light correction |
|---|---|---|
| Comparative example 2 | | |
| Embodiment 4 | | |
| Embodiment 5 | | |
| Embodiment 6 | | |

The invention claimed is:

1. A progressive power lens in which a progressive refracting surface provided with a first region arranged at an upper part of the lens for viewing relatively far, a second region arranged lower than the first region and having a larger refracting power than that of the first region and a progressive zone arranged between these regions, whose refracting power is progressively changing, is formed on an inner surface of the lens, characterized in that an outer surface of the lens is made in a rotationally asymmetrical aspherical shape, wherein when a point on the lens outer surface at a distance of 15 mm upward of the lens along a tangent extending in the perpendicular direction at a far-sighted fitting point is set as A and a point on the lens outer surface at a distance of 15 mm downward of the lens as B, the average surface refracting powers P(A) and P(B) of the lens outer surface at the point A and the point B satisfy the following relation:

a) when both the far-sighted diopter and the near-sighted diopter are negative:

$$P(B)+0.25 \leq P(A) \leq P(B)+ADD;\ and$$

b) when both the far-sighted diopter and the near-sighted diopter are positive:

$$P(A)+0.25 \leq P(B) \leq P(A)+ADD.$$

2. The progressive power lens according to claim 1, wherein the rotationally asymmetrical aspherical shape of the lens outer surface is realized by a difference in average surface refracting powers in a practical region in the upper part referred to as an upper practical region and a practical region in the lower part referred to as a lower practical region of a geometric center set on the outer surface of the lens.

3. The progressive power lens according to claim 2, wherein the average surface refracting powers of the upper practical region and the lower practical region of the geometric center of the lens are set as the upper practical region is greater than the lower practical region when both the far-sighted diopter and the near-sighted diopter are negative, while when the both are positive, the average surface refracting powers are set as the upper practical region is less than the lower practical region.

4. A progressive power lens in which a progressive refracting surface provided with a first region arranged at an upper part of the lens for viewing relatively far, a second region arranged lower than the first region and having a larger refracting power than that of the first region and a progressive zone arranged between these regions, whose refracting power is progressively changing, is formed on an inner surface of the lens, characterized in that an outer surface of the lens is made in a rotationally asymmetrical aspherical shape, wherein the rotationally asymmetrical aspherical shape of the lens outer surface is realized by a difference in average surface refracting powers in a practical region in the upper part referred to as an upper practical region and a practical region in the lower part referred to as a lower practical region of a geometric center set on the outer surface of the lens, wherein the average surface refracting powers of the upper practical region and the lower practical region of the geometric center of the lens are set as the upper practical region is greater than the lower practical region when both the far-sighted diopter and the near-sighted diopter are negative, while when the both are positive, the average surface refracting powers are set as the upper practical region is less than the lower practical region, and wherein when both the far-sighted diopter and the near-sighted diopter are negative, the curve in the perpendicular direction of the outer surface of the lens has any of the following characteristics:

a) as the upper practical region is separated from a virtual horizontal line passing through the geometric center of the lens, the curvature of the curve of the outer surface of the lens is gradually increased, while as the lower practical region is separated from the horizontal line, the curvature of the curve of the outer surface of the lens is gradually decreased;

b) as the upper practical region is separated from a virtual horizontal line passing through the geometric center of the lens, the curvature of the curve of the outer surface of the lens is gradually increased, while the lower practical region has a uniform curvature of the curve; and c) as the lower practical region is separated from a virtual horizontal line, the curvature of the curve of the outer surface of the lens is gradually decreased, while the upper practical region has a uniform curvature of the curve.

5. A progressive power lens in which a progressive refracting surface provided with a first region arranged at an upper part of the lens for viewing relatively far, a second region arranged lower than the first region and having a larger refracting power than that of the first region and a progressive zone arranged between these regions, whose refracting power is progressively changing, is formed on an inner surface of the lens, characterized in that an outer surface of the lens is made in a rotationally asymmetrical aspherical shape, wherein the rotationally asymmetrical aspherical shape of the lens outer surface is realized by difference in average surface refracting powers in a practical region in the upper part referred to as an upper practical region and a practical region in the lower part referred to as a lower practical region of a geometric center set on the outer surface of the lens, wherein the average surface refracting powers of the upper practical region and the lower practical region of the geometric center of the lens are set as the upper practical region is greater than the lower practical region when both the far-sighted diopter and the near-sighted diopter are negative, while when the both are positive, the average surface refracting powers are set as the upper practical region is less than the lower practical region, and wherein when both the far-sighted diopter and the near-sighted diopter are positive, the curve in the perpendicular direction of the outer surface of the lens has any of the following characteristics:

a) as the upper practical region is separated from a virtual horizontal line passing through the geometric center of the lens, the curvature of the curve of the outer surface of the lens is gradually decreased, while as the lower practical region is separated from the horizontal line, the curvature of the curve of the outer surface of the lens is gradually increased;

b) as the upper practical region is separated from a virtual horizontal line passing through the geometric center of the lens, the curvature of the curve of the outer surface of the lens is gradually decreased, while the lower practical region has a uniform curvature of the curve; and c) as the lower practical region is separated from a virtual horizontal line, the curvature of the curve of the outer surface of the lens is gradually increased, while the upper practical region has a uniform curvature of the curve.

6. The progressive power lens according to claim 4, wherein an average surface refracting power at a predetermined point (X, Y) located on a virtual horizontal line crossing a virtual perpendicular line passing through the geometric center of the lens on the outer surface of the lens is set considering a weight based on the direction of the predetermined point (X, Y) with a predetermined reference point in the lens as a reference.

7. The progressive power lens according to claim 5, wherein an average surface refracting power at a predetermined point (X, Y) located on a virtual horizontal line crossing a virtual perpendicular line passing through the geometric center of the lens on the outer surface of the lens is set considering a weight based on the direction of the predetermined point (X, Y) with a predetermined reference point in the lens as a reference.

8. The progressive power lens according to claim 6, when a point on the lens outer surface at a distance of 15 mm upward of the lens along a tangent extending in the perpendicular direction at a far-sighted fitting point is set as A and a point on the lens outer surface at a distance of 15 mm downward of the lens as B, the average surface refracting powers P(A) and P(B) of the lens outer surface at the point A and the point B satisfy the following relation:

$P(B)+0.25=P(A)=P(B)+ADD.$

9. The progressive power lens according to claim 7, wherein when a point on the lens outer surface at a distance of 15 mm upward of the lens along a tangent extending in the perpendicular direction at a far-sighted fitting point is set as A and a point on the lens outer surface at a distance of 15 mm downward of the lens as B, the average surface refracting powers P(A) and P(B) of the lens outer surface at the point A and the point B satisfy the following relation:

$P(A)+0.25=P(B)=P(A)+ADD.$

10. A manufacturing method for a progressive power lens in which a progressive refracting surface provided with a first region arranged at an upper part of the lens for viewing relatively far, a second region arranged lower than the first region and having a larger refracting power than that of the first region and a progressive zone arranged between these regions, whose refracting power is progressively changing, is formed on an inner surface of the lens, characterized in that an outer surface of the lens is made in a rotationally asymmetrical aspherical shape, wherein data of a predetermined progressive refracting surface is designed which realizes a predetermined progressive characteristic for an inner surface of a lens on the premise that an outer surface of the lens is a spherical shape, then, design is made to synthesize data of a predetermined rotationally asymmetric aspherical shape with the spherical shape data set for the outer surface of the lens in the same spherical shape, a correction amount to correct an astigmatic component and a change in the progressive characteristic generated with deformation design to make the lens outer surface in aspherical shape is added to the data of the progressive refracting surface and then, the both surfaces of the lens are molded based on each data.

11. The manufacturing method according to claim 10, wherein the rotationally asymmetrical aspherical shape of the lens outer surface is realized by a difference in average surface refracting powers in a practical region in the upper part referred to as an upper practical region and a practical region in the lower part referred to as a lower practical region of a geometric center set on the outer surface of the lens.

12. The manufacturing method according to claim 11, wherein the average surface refracting powers of the upper practical region and the lower practical region of the geometric center of the lens are set as the upper practical region is greater than the lower practical region when both the far-sighted diopter and the near-sighted diopter are negative, while when the both are positive, the average surface refracting powers are set as the upper practical region is less than the lower practical region.

13. A manufacturing method for the progressive power lens according to claim 4, wherein data of a predetermined progressive refracting surface is designed which realizes a predetermined progressive characteristic for an inner surface of a lens on the premise that an outer surface of the lens is a spherical shape, then, design is made to synthesize data of a predetermined rotationally asymmetric aspherical shape with the spherical shape data set for the outer surface of the lens in the same spherical shape, a correction amount to correct an astigmatic component and a change in the progressive characteristic generated with deformation design to make the lens outer surface in aspherical shape is added to the data of the progressive refracting surface and then, the both surfaces of the lens are molded based on each data.

14. A manufacturing method for the progressive power lens according to claim 5, wherein data of a predetermined progressive refracting surface is designed which realizes a predetermined progressive characteristic for an inner surface of a lens on the premise that an outer surface of the lens is a spherical shape, then, design is made to synthesize data of a predetermined rotationally asymmetric aspherical shape with the spherical shape data set for the outer surface of the lens in the same spherical shape, a correction amount to correct an astigmatic component and a change in the progressive characteristic generated with deformation design to make the lens outer surface in aspherical shape is added to the data of the progressive refracting surface and then, the both surfaces of the lens are molded based on each data.

15. A manufacturing method for the progressive power lens according to claim 1, wherein data of a predetermined progressive refracting surface is designed which realizes a predetermined progressive characteristic for an inner surface of a lens on the premise that an outer surface of the lens is a spherical shape, then, design is made to synthesize data of a predetermined rotationally asymmetric aspherical shape with the spherical shape data set for the outer surface of the lens in the same spherical shape, a correction amount to correct an astigmatic component and a change in the progressive characteristic generated with deformation design to make the lens outer surface in aspherical shape is added to the data of the progressive refracting surface and then, the both surfaces of the lens are molded based on each data.

16. A manufacturing method for the progressive power lens according to claim 2, wherein data of a predetermined progressive refracting surface is designed which realizes a predetermined progressive characteristic for an inner surface of a lens on the premise that an outer surface of the lens is a spherical shape, then, design is made to synthesize data of a predetermined rotationally asymmetric aspherical shape with the spherical shape data set for the outer surface of the lens in the same spherical shape, a correction amount to correct an astigmatic component and a change in the progressive characteristic generated with deformation design to make the lens outer surface in aspherical shape is added to the data of the progressive refracting surface and then, the both surfaces of the lens are molded based on each data.

17. A manufacturing method for the progressive power lens according to claim 3, wherein data of a predetermined progressive refracting surface is designed which realizes a predetermined progressive characteristic for an inner surface of a lens on the premise that an outer surface of the lens is a spherical shape, then, design is made to synthesize data of a predetermined rotationally asymmetric aspherical shape with the spherical shape data set for the outer surface of the lens in the same spherical shape, a correction amount to correct an astigmatic component and a change in the progressive characteristic generated with deformation design to make the lens outer surface in aspherical shape is added to the data of the progressive refracting surface and then, the both surfaces of the lens are molded based on each data.

* * * * *